United States Patent
Puig-Oses et al.

(10) Patent No.: US 7,245,598 B2
(45) Date of Patent: Jul. 17, 2007

(54) FEEDBACK OF CHANNEL QUALITY INFORMATION

(75) Inventors: David Puig-Oses, San Diego, CA (US); Yongbin Wei, San Diego, CA (US); Stein A. Lundby, Solana Beach, CA (US)

(73) Assignee: Qualcomm Incorporated, San Diego, CA (US)

( * ) Notice: Subject to any disclaimer, the term of this patent is extended or adjusted under 35 U.S.C. 154(b) by 1019 days.

(21) Appl. No.: 10/081,453

(22) Filed: Feb. 21, 2002

(65) Prior Publication Data

US 2003/0156556 A1    Aug. 21, 2003

(51) Int. Cl.
*H04Q 7/00* (2006.01)
*H04J 3/00* (2006.01)
*H04B 1/00* (2006.01)

(52) U.S. Cl. ................. 370/334; 370/342; 370/345; 455/69; 455/562.1

(58) Field of Classification Search ........ 370/328–348, 370/431, 441, 447, 461, 462, 468, 489; 455/69, 455/562.1
See application file for complete search history.

(56) References Cited

U.S. PATENT DOCUMENTS

| | | | |
|---|---|---|---|
| 6,208,632 B1 * | 3/2001 | Kowalski et al. | 370/335 |
| 6,426,960 B2 | 7/2002 | Antonio | |
| 6,876,870 B2 * | 4/2005 | Hiramatsu et al. | 455/562.1 |
| 6,968,212 B1 * | 11/2005 | Aoyama et al. | 455/562.1 |
| 7,116,944 B2 * | 10/2006 | Das et al. | 455/69 |
| 2002/0027956 A1 * | 3/2002 | Lee et al. | 375/262 |
| 2002/0101839 A1 * | 8/2002 | Farley et al. | 370/329 |
| 2002/0150065 A1 * | 10/2002 | Ponnekanti | 370/334 |
| 2003/0072395 A1 * | 4/2003 | Jia et al. | 375/341 |
| 2003/0156556 A1 * | 8/2003 | Puig-Oses et al. | 370/328 |
| 2004/0013103 A1 * | 1/2004 | Zhang et al. | 370/345 |

* cited by examiner

*Primary Examiner*—Wing Chan
*Assistant Examiner*—Venkatesh Haliyur
(74) *Attorney, Agent, or Firm*—Thomas R. Rouse; Thien T. Nguyen; Kenneth K. Vu

(57) ABSTRACT

Methods and apparatus are presented for improving the feedback of channel information to a serving base station, which allows a reduction in the reverse link load while allowing the base station to improve the forward link data throughput. Over a channel quality indicator channel, a carrier-to-interference (C/I) symbol is transmitted over multiple slots at a reduced rate, which increases the likelihood that the base station can decode said symbol. The reduced rate mode can be selectively triggered by a high velocity condition or other unfavorable channel condition. The C/I symbol is used to determine transmission formats, power levels, and data rates of forward link transmissions.

9 Claims, 4 Drawing Sheets

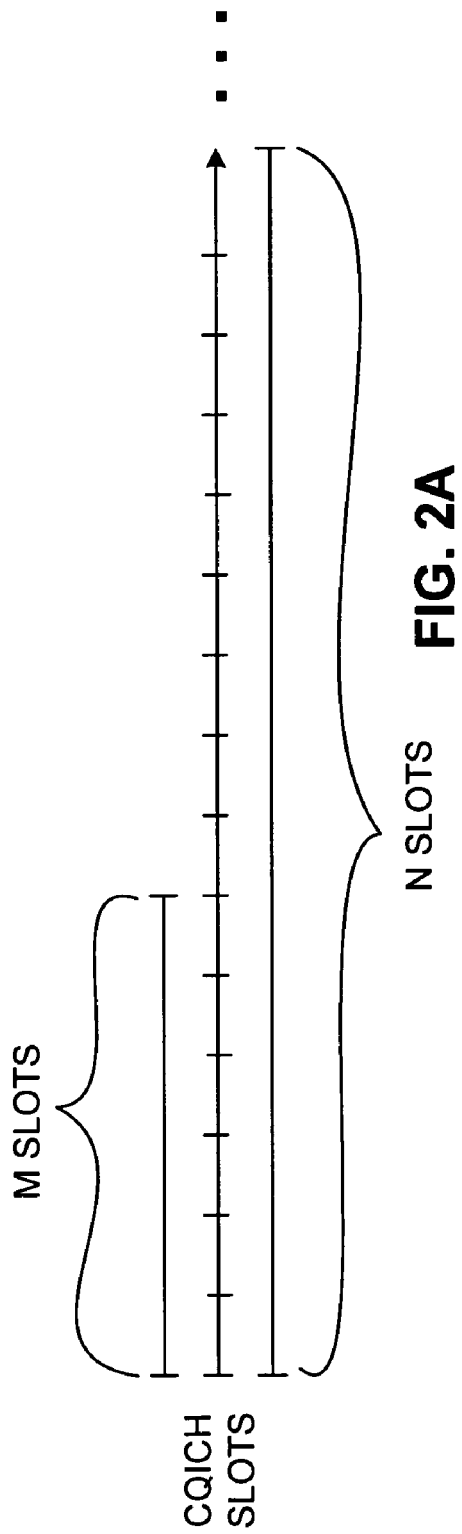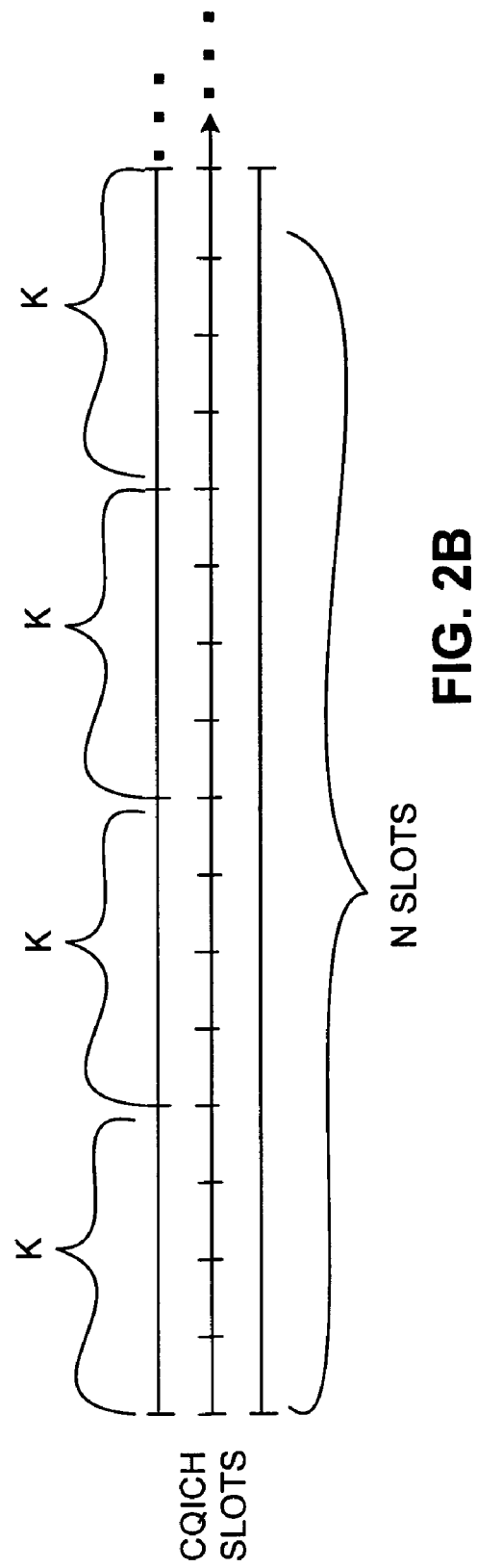

FEEDBACK OF CHANNEL QUALITY INFORMATION

BACKGROUND

1. Field

The present invention relates generally to communications, and more specifically, to improving the feedback of channel information, which can be used to improve the scheduling and rate control of traffic over a wireless communication system.

2. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communication services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA and 3GPP2. Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214.

The telecommunication standards cited above are examples of only some of the various communication systems that can be implemented. Some of these various communication systems are configured so that remote stations can transmit information regarding the quality of the transmission medium to a serving base station. This channel information can then be used by the serving base station to optimize the power levels, the transmission formats, and the timing of forward link transmissions, and further, to control the power levels of reverse link transmissions.

As used herein, "forward link" refers to the transmissions directed from a base station to a remote station and "reverse link" refers to transmissions directed from a remote station to a base station. The forward link and the reverse link are uncorrelated, meaning that observations of one do not facilitate the prediction of the other. However, for stationary and slow-moving remote stations, the characteristics of the forward link transmission path will be observed to be similar to the characteristics of the reverse link transmission path in a statistical sense.

Channel conditions of received forward link transmissions, such as the carrier-to-interference (C/I) ratio, can be observed by a remote station, which reports such information to a serving base station. The base station then uses this knowledge to schedule transmissions to the remote station selectively. For example, if the remote station reports the presence of a deep fade, the base station would refrain from scheduling a transmission until the fading condition passes. Alternatively, the base station may decide to schedule a transmission, but at a high transmission power level in order to compensate for the fading condition. Alternatively, the base station may decide to alter the data rate at which transmissions are sent, by transmitting data in formats that can carry more information bits. For example, if the channel conditions are bad, data can be transmitted in a transmission format with redundancies so that corrupted symbols are more likely to be recoverable. Hence, the data throughput is lower than if a transmission format without redundancies were used instead.

The base station can also use this channel information to balance the power levels of all the remote stations within operating range, so that reverse link transmissions arrive at the same power level. In CDMA-based systems, channelization between remote stations is produced by the use of pseudorandom codes, which allows a system to overlay multiple signals on the same frequency. Hence, reverse link power control is an essential operation of CDMA-based systems because excess transmission power emitted from one remote station could "drown out" transmissions of its neighbors.

In communication systems that use feedback mechanisms to determine the quality of the transmission media, channel conditions are continuously conveyed on the reverse link. A remote station monitors the channel quality of the forward link and feeds it back to the base station via the Reverse Channel Quality Indicator Channel (R-CQICH). The transmission of a channel quality value on the R-CQICH is carried out in every slot of the R-CQICH. For slow moving or stationary remote stations, the transmission of a channel quality value on each slot allows the base station to accurately predict the state of the forward link. However, when a remote station is traveling at a high velocity, the condition of the reverse link worsens so that the base station cannot accurately decode the received channel quality values within a designated frame error rate. Moreover, the high velocity causes fast fading conditions that the base station cannot accurately estimate using outdated channel quality values.

SUMMARY

Methods and apparatus are presented herein to address the problems stated above. In one aspect, a channel quality feedback message is spread and/or repeated over multiple slots of a CQICH frame. In this embodiment, the reception of the channel quality feedback becomes reliable because of the time diversity over the multiple slots. The events that trigger the repetition of channel quality feedback can be as follows:

1. The base station detects that the channel quality feedback is not reliable and signals the mobile station to repeat the same channel quality feedback over multiple slots, or 2. The remote station can detect that its velocity is too high. The remote station can either signal the base station that the channel quality feedback will be transmitted over multiple slots, as described above, or the remote station sends a request to the base station for sending the channel quality feedback message over multiple slots. Upon receipt of an approval from the base station, the remote station starts the channel quality feedback in the above fashion.

The repetition factors can be carried over the related signaling message, or the repetition factors can be predetermined as system parameters.

BRIEF DESCRIPTION OF THE DRAWINGS

FIG. 2A and FIG. 2B are timelines that describe the interactions between the re-synch subchannel and the differential feedback subchannel.

DETAILED DESCRIPTION

Figure 1:
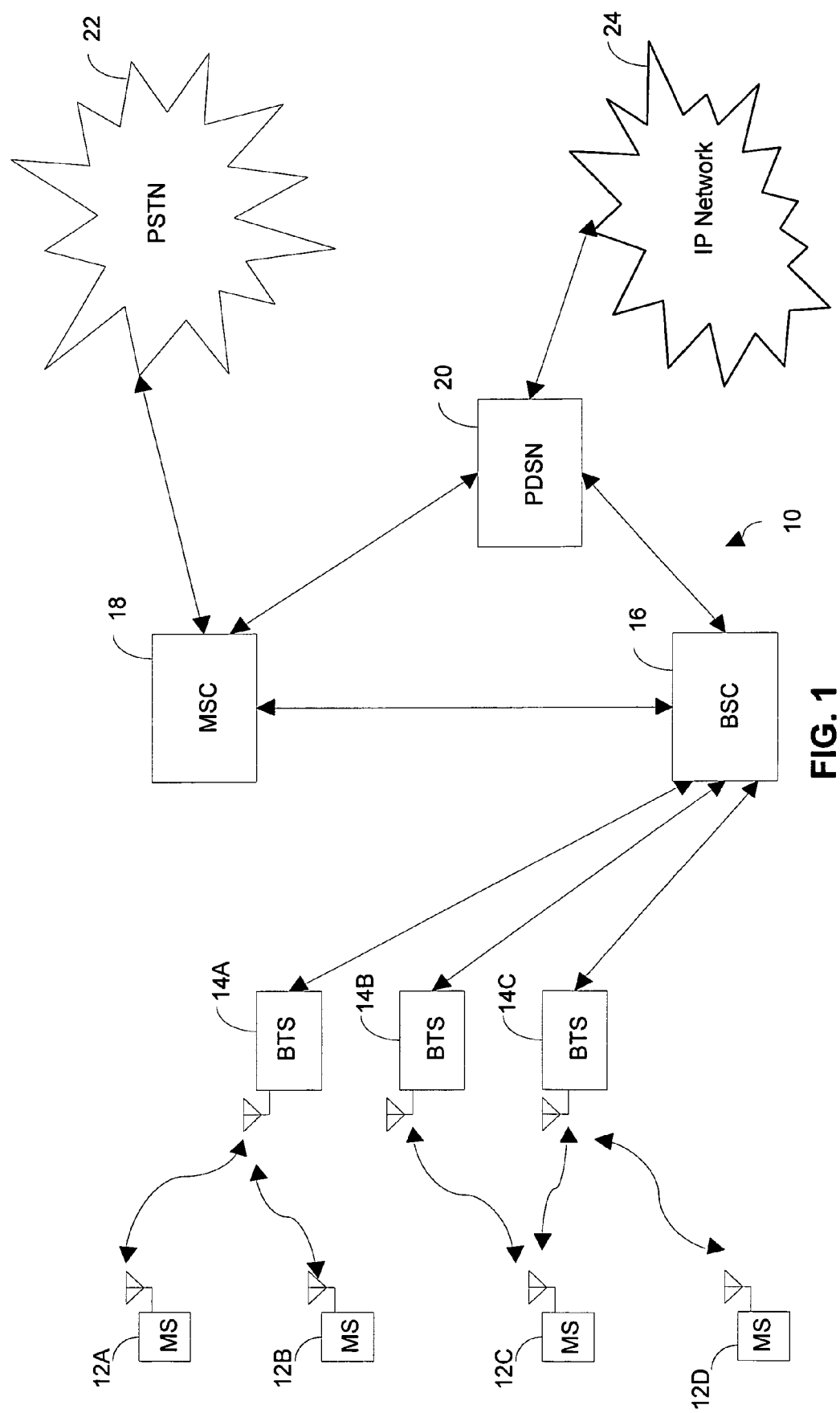
FIG. 1 is a diagram of a wireless communication network.

As illustrated in FIG. 1, a wireless communication network 10 may generally includes a plurality of mobile stations (also called remote stations or subscriber units or user equipment) 12A–12D, a plurality of base stations (also called base station transceivers (BTSs) or Node B) 14A–14C, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12A–12D, three base stations 14A–14C, one BSC 16, one MSC 18, and one PDSN 20 are shown. It would be understood by those skilled in the art that there could be more or less number of mobile stations 12, base stations 14, BSCs 16, MSCs 18, and PDSNs 20.

In one embodiment the wireless communication network 10 is a packet data services network. The mobile stations 12A–12D may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12A–12D may advantageously be configured to perform one or more wireless packet data protocols such as described in, for example, the EIA/TIA/IS-707 standard. In a particular embodiment, the mobile stations 12A–12D generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC 18 is coupled to the BSC 16 and the PSTN 22, and the BSC 16 is coupled to the base stations 14A–14C via wirelines configured for transmission of voice and/or data packets in accordance with any of several known protocols including, e.g., E1, T1, Asynchronous Transfer Mode (ATM), LP, PPP, Frame Relay, HDSL, ADSL, or xDSL. In an alternate embodiment, the BSC 16 can be coupled directly to the PDSN 20.

During typical operation of the wireless communication network 10, the base stations 14A–14C receive and demodulate sets of reverse signals from various mobile stations 12A–12D engaged in telephone calls, Web browsing, or other data communications. Each reverse signal received by a given base station 14A–14C is processed within that base station 14A–14C. Each base station 14A–14C may communicate with a plurality of mobile stations 12A–12D by modulating and transmitting sets of forward signals to the mobile stations 12A–12D. For example, as shown in FIG. 1, the base station 14A communicates with first and second mobile stations 12A, 12B simultaneously, and the base station 14C communicates with third and fourth mobile stations 12C, 12D simultaneously. The resulting packets are forwarded to the BSC 16, which provides call resource allocation and mobility management functionality including the orchestration of soft handoffs of a call for a particular mobile station 12A–12D from one base station 14A–14C to another base station 14A–14C. For example, a mobile station 12C is communicating with two base stations 14B, 14C simultaneously. Eventually, when the mobile station 12C moves far enough away from one of the base stations 14C, the call will be handed off to the other base station 14B.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In some communication systems, packets carrying data traffic are divided into subpackets, which occupy slots of a transmission channel. For illustrative ease only, the nomenclature of a cdma2000 system is used hereafter. Such use is not intended to limit the implementation of the embodiments herein to cdma2000 systems. Implementations in other systems, such as, e.g., WCDMA, can be accomplished without affecting the scope of the embodiments described herein.

The forward link from the base station to a remote station operating within the range of the base station can comprise a plurality of channels. Some of the channels of the forward link can include, but are not limited to a pilot channel, synchronization channel, paging channel, quick paging channel, broadcast channel, power control channel, assignment channel, control channel, dedicated control channel, medium access control (MAC) channel, fundamental channel, supplemental channel, supplemental code channel, and packet data channel. The reverse link from a remote station to a base station also comprises a plurality of channels. Each channel carries different types of information to the target destination. Typically, voice traffic is carried on fundamental channels, and data traffic is carried on supplemental channels or packet data channels. Supplemental channels are usually dedicated channels, while packet data channels usually carry signals that are designated for different parties in a time and/or code-multiplexed manner. Alternatively, packet data channels are also described as shared supplemental channels. For the purposes of describing the embodiments herein, the supplemental channels and the packet data channels are generically referred to as data traffic channels.

Voice traffic and data traffic are typically encoded, modulated, and spread before transmission on either the forward or reverse links. The encoding, modulation, and spreading can be implemented in a variety of formats. In a CDMA system, the transmission format ultimately depends upon the type of channel over which the voice traffic and data traffic are being transmitted and the condition of the channel, which can be described in terms of fading and interference.

Predetermined transmit formats, which correspond to a combination of various transmit parameters, can be used to simplify the choice of transmission formats. In one embodiment, the transmission format corresponds to a combination of any or all of the following transmission parameters: the modulation scheme used by the system, the number of orthogonal or quasi-orthogonal codes, an identification of the orthogonal or quasi-orthogonal codes, the data payload size in bits, the duration of the message frame, and/or details regarding the encoding scheme. Some examples of modulation schemes used within communication systems are the Quadrature Phase Shift Keying scheme (QPSK), 8-ary Phase Shift Keying scheme (8-PSK), and 16-ary Quadrature Amplitude Modulation (16-QAM). Some of the various encoding schemes that can be selectively implemented are convolutional encoding schemes, which are implemented at various rates, or turbo coding, which comprises multiple encoding steps separated by interleaving steps.

Orthogonal and quasi-orthogonal codes, such as the Walsh code sequences, are used to channelize the information sent to each remote station. In other words, Walsh code sequences are used on the forward link to allow the system to overlay multiple users, each assigned one or several different orthogonal or quasi-orthogonal codes, on the same frequency during the same time duration.

A scheduling element in the base station is configured to control the transmission format of each packet, the rate of each packet, and the slot times over which each packet is to be transmitted to a remote station. The terminology "packet" is used to describe system traffic. Packets can be divided into subpackets, which occupy slots of a transmission channel. "Slot" is used to describe time duration of a message frame. The use of such terminology is common in cdma2000 systems, but the use of such terminology is not meant to limit the implementation of the embodiments herein to cdma2000 systems. Implementation in other systems, such as, e.g. WCDMA, can be accomplished without affecting the scope of the embodiments described herein.

Scheduling is a vital component in attaining high data throughput in a packet-based system. In the cdma2000 system, the scheduling element (which is also referred to as a "scheduler" herein) controls the packing of payload into redundant and repetitious subpackets that can be soft-combined at a receiver, so that if a received subpacket is corrupted, it can be combined with another corrupted subpacket to determine the data payload within an acceptable frame error rate (FER). For example, if a remote station requests the transmission of data at 76.8 kbps, but the base station knows that this transmission rate is not possible at the requested time due to the condition of channel, the scheduler in the base station can control the packaging of the data payload into multiple subpackets. The remote station will receive multiple corrupted subpackets, but will still be likely to recover the data payload by soft-combining the uncorrupted bits of the subpackets. Hence, the actual transmission rate of the bits can be different from the data throughput rate.

The scheduling element in the base station uses an open-loop algorithm to adjust the data rate and scheduling of forward link transmissions. The open-loop algorithm adjusts transmissions in accordance with the varying channel conditions typically found in a wireless environment. In general, a remote station measures the quality of the forward link channel and transmits such information to the base station. The base station uses the received channel conditions to predict the most efficient transmission format, rate, power level and timing of the next packet transmission. In the cdma2000 1xEV-DV system, the remote stations can use a channel quality feedback channel (CQICH) to convey channel quality measurements of the best serving sector to the base station. The channel quality may be measured in terms of a carrier-in-interference (C/I) ratio and is based upon received forward link signals. The C/I value is mapped onto a five-bit channel quality indicator (CQI) symbol, wherein the fifth bit is reserved. Hence, the C/I value can have one of sixteen quantization values.

Since the remote station is not prescient, the remote station transmits the C/I values continuously, so that the base station is aware of the channel conditions if ever any packets need to be transmitted on the forward link to that remote station. The continuous transmission of 4-bit C/I values consumes the battery life of the remote station by occupying hardware and software resources in the remote station.

In addition to the problems of battery life and reverse link loading, there is also a problem of latency. Due to propagation and processing delays, the base station is scheduling transmissions using outdated information. If the typical propagation delay is 2.5 ms in duration, which corresponds to a 2-slot delay in systems with 1.25 ms slots, then the base station may be reacting to a situation that no longer exists, or may fail to react in a timely manner to a new situation.

For the above reasons, the communication network requires a mechanism to convey information to the base station that allows the base station to quickly reschedule transmissions due to sudden changes in the channel environment. In addition, the aforementioned mechanism should reduce the drain on battery life of the remote station and the load on the reverse link.

The embodiments described herein are directed to improving the feedback mechanism for conveying channel information, such as the carrier-to-interference (C/I) ratio, from the remote station to the base station while reducing the load of the reverse link. By improving the feedback mechanism, the embodiments improve the ability of a base station to schedule transmissions and the data rates of the transmissions in accordance with actual channel conditions. In one embodiment, the base station uses the full C/I value that is associated with a first transmission channel in order to determine the scheduling, data rates, and transmission formats of traffic on a second transmission channel. For example, the channel conditions of the pilot can be used to determine the conditions of a traffic channel.

In a general description of the embodiments, full C/I values are transmitted on the CQI channel in a reduced rate mode, wherein operation in the reduced rate mode is triggered by detection of unfavorable channel conditions or by detection of a high velocity condition. Detection procedures can be implemented at either a base station or a remote station.

Operating the CQICH in a Reduced Rate Mode

The values sent on the CQI channel are determined based on the forward link C/I measurements. In one embodiment, the C/I measurements are transmitted at a reduced rate mode. In a reduced rate mode, a full C/I value is spread over at least two slots of an N-slot CQICH frame. For example, the full C/I value may be transmitted at a reduced rate over 2, 4, 8, or 16 slots of a 16-slot CQICH frame.

The remote station should transmit the full C/I value at the reduced rate when the reverse link is suffering from unfavorable channel conditions. In one embodiment, the base station determines unfavorable reverse link channel conditions and transmits a control signal to the remote station, wherein the control signal informs the remote station as to whether the CQI channel should operate at a reduced rate or not. Alternatively, the remote station can be programmed to make this determination independently. In one embodiment, the remote station predicts that the conditions will become unfavorable due to high velocity, i.e., the remote station determines that it is moving approximately 30 km/h or faster.

In one implementation of the embodiment, a C/I value is transmitted once over M slots of a N-slot frame. FIG. 2A illustrates this implementation. In another embodiment, a C/I value is transmitted repetitiously every K slots of a N-slot frame. FIG. 2B is a timeline illustrating this implementation. In yet another embodiment, a full C/I value is transmitted over M slots, and repeated t times, such that t×M<N, i.e., some of the slots of the CQI frame are not used for transmissions.

In another implementation, the full C/I value can be sent at unscheduled slots, whenever the remote station determines that the C/I estimate kept at the base station is out of synchronization. This embodiment requires that the base station is continuously monitoring the CQI channel to determine whether an unscheduled full C/I value symbol is present or not.

Triggering the CQI Channel Reduced Rate Mode from a Base Station

A scheduling element in a base station can be configured to interpret channel information received on the CQI channel, wherein the channel information is used to make transmission decisions that account for the state of the channel. The scheduling element can comprise a processing element coupled to a memory element, and is communicatively coupled to the receiving subsystem and the transmission subsystem of the base station.

Figure 3:
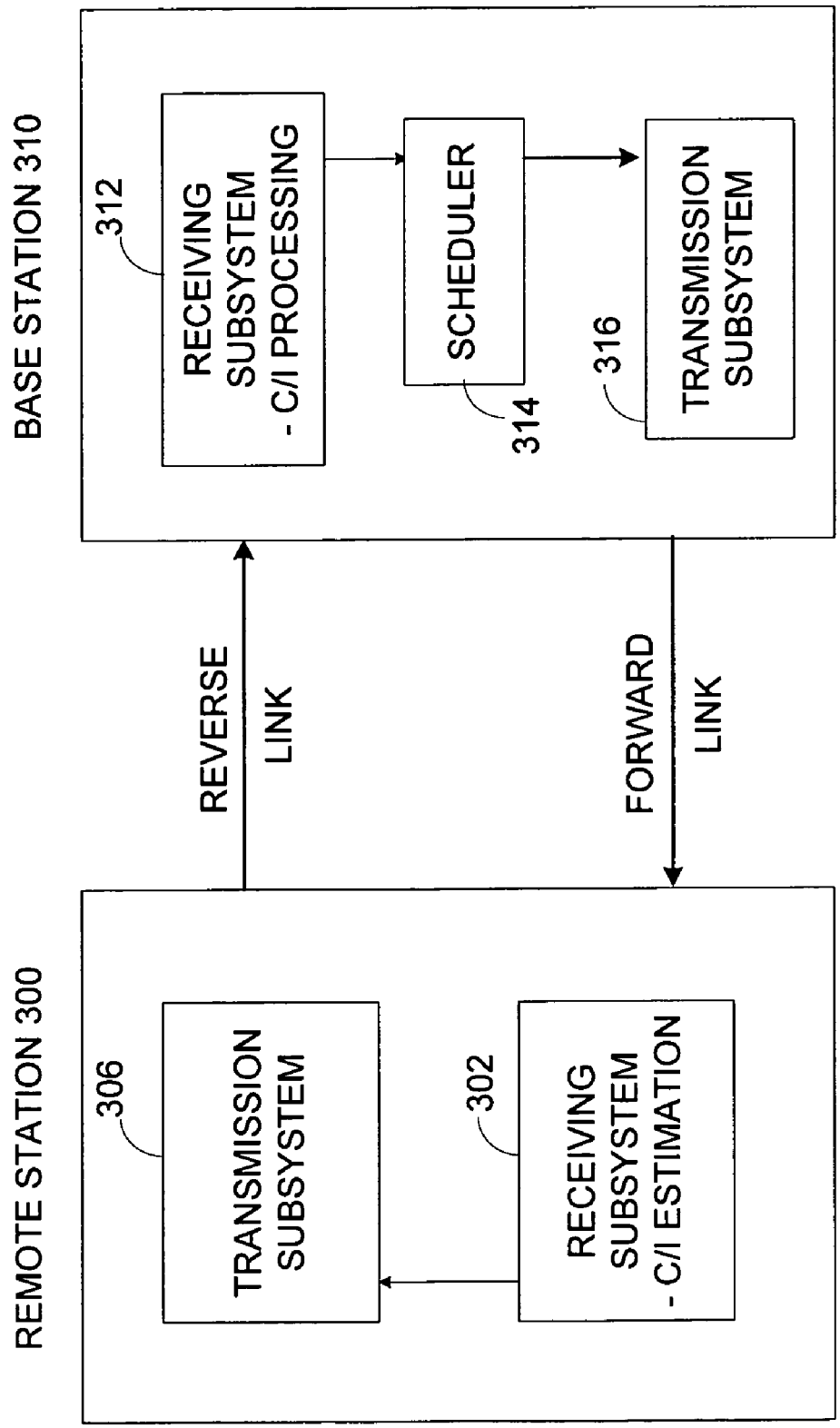
FIG. 3 is a functional block diagram of a remote station in communication with a base station.

FIG. 3 is a block diagram of some of the functional components of a base station with a scheduling element. A remote station 300 transmits on the reverse link to a base station 310. At a receiving subsystem 312, the received transmissions are de-spread, demodulated and decoded. A scheduler 314 receives a decoded C/I value and orchestrates the appropriate transmission formats, power levels, and data rates of transmissions from the transmission subsystem 316 on the forward link.

Figure 4:
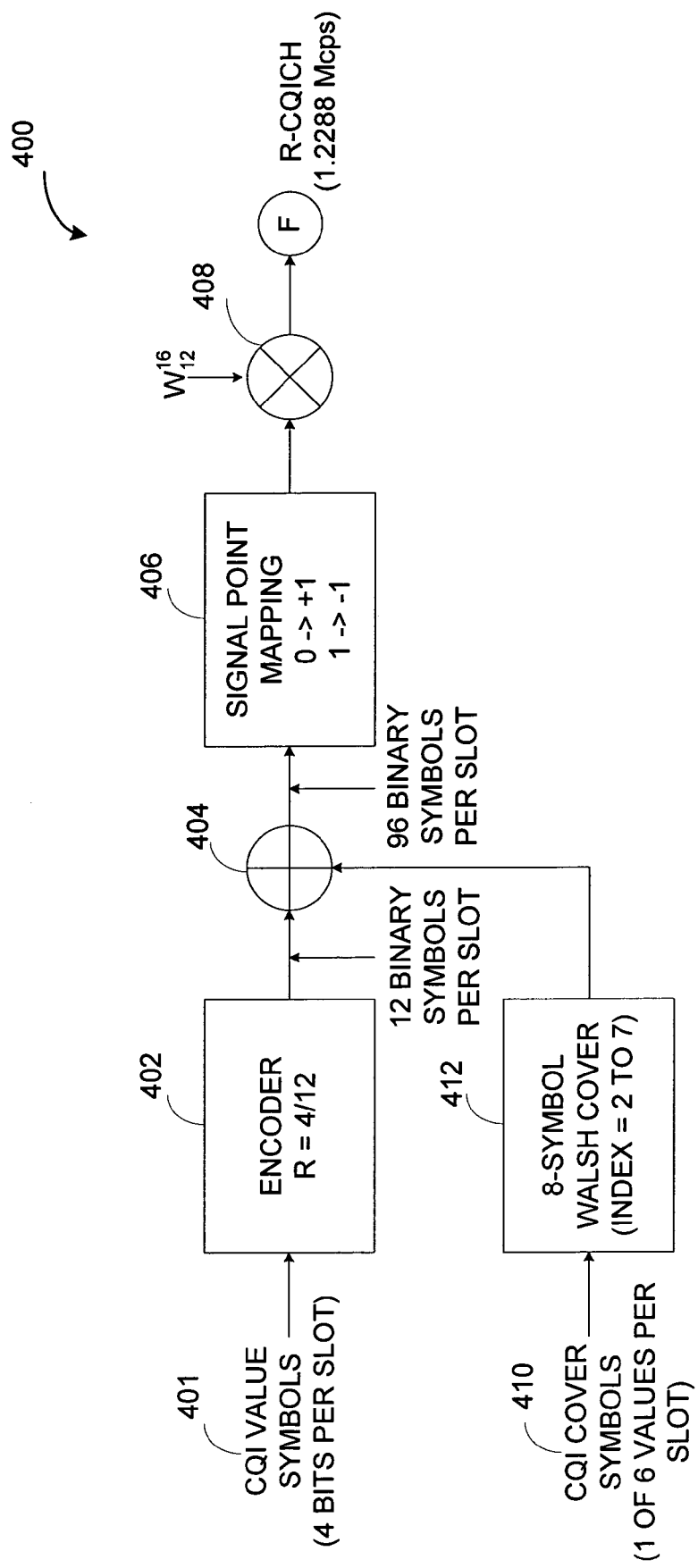
FIG. 4 is a block diagram of channel elements for generating the channel quality feedback channel (CQICH).

At the remote station 300, a receiving subsystem 302 receives the forward link transmission and determines the forward link channel characteristics. A transmission subsystem 306, in which the channel elements described by FIG. 4 is located, transmits such forward link channel characteristics to the base station 310.

In the embodiments described herein, the scheduling element 314 can be programmed to interpret the channel information received on the CQI channel. In one embodiment, the base station can determine the energy levels of the symbols received on the CQI channel, compare the energy levels to a predetermined threshold amount, and then determine that the remote station should be transmitting the C/I values on the CQI channel in a reduced rate mode. The energy levels can be determined in accordance with a number of methods. One quick, computationally light method is the examination of the CQI bits that have been sent on the CQI channel. Knowledge of the cumulative sum of the CQI bits can be used by the base station (or the remote station) to determine the average power of the received signals. In another method, the CQI decoder in the base station can be configured to determine that the received bits do not clearly correspond to a valid codeword hypothesis, indicating the potential presence of errors, and to report the potential for errors (or the erasures resulting from said errors) to the scheduler. In one embodiment the decoder consists in a correlation decoder, thereby correlating the received signal with all possible codewords. The decoder compares the magnitude of the output of the strongest correlation $C_1$ to the magnitude of the output of the second strongest correlation $C_2$, and determines that the received CQI signal does not clearly correspond to a valid codeword if the value $(C_1-C_2)$ is below a threshold $T_{diff}$, or if $C_1$ is below a secondary threshold $T_0$.

Initiating the Reduced Rate Mode by a Remote Station

The remote station can also make a determination as to whether symbols transmitted on the CQI channel should be transmitted at a reduced rate or not. In one embodiment, the remote station transmits a message to a serving base station that CQI channel transmissions will be at a designated reduced rate. Alternatively, in another embodiment, the remote station transmits a request message to the serving base station for reduced rate operation and waits for the serving base station to send a control message that allows such operation.

One of the methods for determining whether the symbols on the CQI channel should be transmitted at a reduced rate is the use of velocity information. A general observation is that a remote station traveling at high velocity will experience unfavorable channel conditions. Hence, in one embodiment, a processing element and a memory element can be configured to operate with other components of the remote station to determine the velocity of the remote station, and then selectively implement the reduced rate mode in accordance with the velocity. For example, at a high velocity of 30 km/h or greater, the transmissions on the CQI channel will be sent at a reduced rate.

In another aspect of the embodiment, the velocity of the remote station can be determined through Doppler frequency estimation, which is proportional to the velocity of the remote station. Doppler estimation can also be performed using knowledge of the transmitted power control bits, at either the remote station or the base station.

The embodiments described above serve the practical purpose of allowing the base station to more closely model the event of a fast fade, which can occur when a remote station is traveling at high velocities. Rayleigh fading, also known as multipath interference, occurs when multiple copies of the same signal arrive at the receiver in a destructive manner. Substantial multipath interference can occur to produce flat fading of the entire frequency bandwidth. If the remote station is travelling in a rapidly changing environment, deep fades could occur at scheduled transmission times. When such a circumstance occurs, the base station requires channel information that allows it to reschedule transmissions quickly and accurately. At the reduced rate mode, the base station receives a reduced rate C/I value over more than one slot, but the base station can still compensate for the fade before the C/I value is fully received over the multiple slots, if the base station can partially decode the portion of the symbol that has already been received.

The use of reduced rate modes as described above allows the base station to react to the changing environment in which the remote station is operating.

FIG. 4 is a block diagram of channel elements that can implement the embodiments described above in a cdma2000 1xEV-DV system. C/I ratio values 401 are input into an encoder 402 at rate R=4/12 so that 12 binary symbols are generated for each slot. The 12 binary symbols are spread with a Walsh code generated by a covering element 412. Covering element 412 selects one of six allowed spreading Walsh sequences based on cover symbols 410 to indicate the index of the serving base station. The output of the covering element 412 and the encoder 402 are combined by an adder 404 to form 96 binary symbols per slot. The output from the adder 404 is mapped in a mapping element 406 and then spread by a Walsh spreading element 408 to generate the CQI channel 400.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for controlling the operation of a quality feedback channel in a wireless communication system, comprising:
   a computer-readable memory element; and
   a processing element configured to execute a set of computer-executable instructions stored on the computer-readable memory element, the set of said instructions for:
   determining a channel quality value associated with a transmission channel;
   determining a condition of the transmission channel;
   if the transmission channel condition is favorable, then transmitting the channel quality value over one slot of the channel quality feedback channel, wherein the condition of the transmission channel is determined to be favorable by comparing energy levels of symbols received on the transmission channel to a predetermined threshold amount;
   if the channel condition is not favorable, then transmitting the channel quality value over a plurality of slots of the channel quality feedback channel; and
   determining a transmission rate of the channel quality value over the feedback channel based on the condition of the transmission channel.

2. The apparatus of claim 1, wherein the condition of the transmission channel is based upon a velocity estimate, wherein the velocity estimate is determined by a Doppler frequency estimation method.

3. The apparatus of claim 1, wherein the condition of the transmission channel is based upon a power level estimate.

4. The apparatus of claim 1, wherein the condition of the transmission channel is based upon whether a fast fade occurs in the transmission channel.

5. A method for improving the reception of a channel quality value, comprising:
   determining whether the condition of a transmission channel is favorable;
   if the condition of the transmission channel is favorable, then transmitting the channel quality value over one slot of a feedback channel, wherein the condition of the transmission channel is determined to be favorable by comparing energy levels of symbols received on the transmission channel to a predetermined threshold amount;
   if the condition of the transmission channel is unfavorable, then transmitting the channel quality value over more than one slot of the feedback channel; and
   determining a transmission rate of the channel quality value over the feedback channel based on the condition of the transmission channel.

6. The method of claim 5, wherein transmitting the channel quality value over more than one slot of the feedback channel further comprises:

- repeating the channel quality value over a frame of the feedback channel.

7. The method of claim 5, wherein the channel condition is unfavorable if a first station and a second station travel at a high velocity in relation to each other, wherein the first station originates the feedback channel and the second station originates the transmission channel.

8. A method for improving the reception of a channel quality value at a base station, comprising:

- determining whether the condition of a feedback channel from a remote station is favorable, wherein the condition of the feedback channel is determined to be favorable by comparing energy levels of symbols received on the feedback channel to a predetermined threshold amount;
- if the condition of the channel is unfavorable, then transmitting a control signal to the remote station, wherein the control signal triggers a reduced rate mode for transmitting the channel quality value over a feedback channel from the remote station;
- if the condition of the channel is favorable, then allowing the remote station to control the transmission of the channel quality value over the feedback channel; and
- determining a transmission rate of the channel quality value over the feedback channel based on the condition of the transmission channel.

9. An apparatus for improving the reception of a channel quality value at a base station, comprising:

- means for determining whether the condition of a feedback channel from a remote station is favorable, wherein the condition of the feedback channel is determined to be favorable by comparing energy levels of symbols received on the feedback channel to a predetermined threshold amount;
- means for transmitting a control signal to the remote station if the condition of the channel is unfavorable, wherein the control signal triggers a reduced rate mode for transmitting the channel quality value over a feedback channel from the remote station; and if the condition of the channel is favorable, then allowing the remote station to control the transmission of the channel quality value over the feedback channel; and
- means for determining a transmission rate of the channel quality value over the feedback channel based on the condition of the transmission channel.

* * * * *